(12) United States Patent
Ko et al.

(10) Patent No.: US 8,140,304 B2
(45) Date of Patent: Mar. 20, 2012

(54) METHOD OF CLOTH SIMULATION USING LINEAR STRETCH/SHEAR MODEL

(76) Inventors: Hyeong-Seok Ko, Seoul (KR); Kwang-Jin Choi, Seoul (KR)

( * ) Notice: Subject to any disclaimer, the term of this patent is extended or adjusted under 35 U.S.C. 154(b) by 364 days.

(21) Appl. No.: 11/777,924

(22) Filed: Jul. 13, 2007

(65) Prior Publication Data

US 2009/0018803 A1  Jan. 15, 2009

(51) Int. Cl.
*G06G 7/48* (2006.01)
(52) U.S. Cl. .......................................................... 703/6
(58) Field of Classification Search .................... 703/6
See application file for complete search history.

(56) References Cited

U.S. PATENT DOCUMENTS

| | | | |
|---|---|---|---|
| 6,573,897 B1* | 6/2003 | Desbrun et al. | 345/473 |
| 2002/0180739 A1* | 12/2002 | Reynolds et al. | 345/474 |
| 2005/0046629 A1* | 3/2005 | Jeong et al. | 345/473 |
| 2007/0085851 A1* | 4/2007 | Muller et al. | 345/474 |

OTHER PUBLICATIONS

Kwang-Jin Choi and Hyeong-Seok Ko, "Stable but Responsive Cloth", 2002, ACM Transactions on Graphics, vol. 21, issue 3, pp. 604-611.*
Kwang-Jin Choi and Hyeong-Seok Ko, "Extending the Immediate Buckling Model to Triangular Meshes for Simulating Complex Clothes", 2003, Eurographics 2003, six unnumbered pages.*
David Baraff and Andrew Witkin, "Large Steps in Cloth Simulation", 1998, Proceedings of the 25th annual conference on Computer graphics and interactive techniques, pp. 43-54.*
Frank S. Crawford, "Waves", 1968, McGraw-Hill Book Company, pp. 17-18, 79-80.*
Herbert Goldstein, "Classical Mechanics", second edition, 1981, Addison-Wesley, pp. 258-259, 545-546.*
Mark Meyer et al., "Interactive Animation of Cloth-like Objects in Virtual Reality", May 2001, The Journal of Visualization and Computer Animation, vol. 12, Issue 1, ten unnumbered pages.*
A.R. Atilgan et al., "Anisotropy of Fluctuation Dynamics of Proteins with an Elastic Network Models", 2001, Biophysical Journal, vol. 80, pp. 505-515.*
J.S. Jensen, "Photonic band gaps and vibrations in one- and two-dimensional mass-spring structures", 2003, Journal of Sound and Vibration, vol. 266, pp. 1053-1078.*
Kwang-Jin Choi et al., "Advanced topics on clothing simulation and animation", 2005, International Conference on Computer Graphics and Interactive Techniques, pp. 1-120.*

* cited by examiner

*Primary Examiner* — Paul Rodriguez
*Assistant Examiner* — Russ Guill
(74) *Attorney, Agent, or Firm* — John K. Park; Park Law Firm (57) ABSTRACT

Deformations occurring in cloth can be decomposed into two components: the in-plane and the out-of-plane deformations. Stretch and shear are in-plane deformation, and bending is out-of-plane deformation. In the method, the numerical simulation can be done in real-time, and the models fix some flaws that existed in previous real-time models, leading to conspicuous reduction of artifacts. The $(|x|-C)^2$ in the energy function is replaced with $|x-x^*|^2$ for some constant vector $x^*$, such that the force Jacobian becomes a constant, which obviates solving the large system of linear equations at every time step. The method uses simplified physical models for both edge-based and triangle-based systems.

20 Claims, 6 Drawing Sheets

METHOD OF CLOTH SIMULATION USING LINEAR STRETCH/SHEAR MODEL

BACKGROUND

1. Field

The present invention relates to a method of cloth simulation using linear stretch/shear model, and more particularly to a method of cloth simulation using linearized energy functions.

2. Brief Discussion of the Related Art

When it is needed to create an animated image of humans with a sufficient level of details and realism, whether it is in a movie, animation, video games, or virtual reality (VR) simulation, the problem of simulating dynamic movements of clothes arises. Unfortunately, clothing animation has been and still remains a stressful task to the animators. One of the major reasons for the frustration is the amount of computation clothing simulation involves; it takes several days of simulation time to produce one minute long animation of a ten thousand polygon outfit. Unless one gives up the quality drastically, the speed of simulation is far from real-time.

SUMMARY

One aspect of the invention provides a method of simulation of a cloth using an edge-based linear stretch and shear model. The method comprises: a) mapping information of geometry of material points, $P_1, \ldots, P_N$, of the cloth into a mesh of nodes, where N is the number of material points, and an $i^{th}$ node of said mesh having a position $x_i$, a mass $m_i$, and a velocity $v_i$; b) calculating a change of geometry of the mesh of nodes at a plurality of time steps using a number of equations of motion based on a force applied to the node by applying linear stretch and shear models to translation and rotation of each mesh node, wherein the number of equations is less than or equal to 3N; and c) updating the position $x_i$ and the velocity $v_i$ of the mesh nodes, wherein an in-plane deformation of the cloth is represented by stretches along edges defined by two neighboring nodes, wherein an energy function for the equations of motion of two neighboring nodes i, j is approximated during each time step as;

$$E_{ij}^s = \frac{1}{2}k(x_{ij} - x_{ij}^*) \cdot (x_{ij} - x_{ij}^*),$$

where k is a spring constant connecting the nodes i and j, $x_{ij} = x_j - x_i$, and $x_{ij}^*$ is a vector that is calculated at each time step but regarded as constant when differentiating, wherein at least part of the force used in the equations of motion is determined by differentiating the energy function.

Mapping information of geometry of material points comprises: selecting a plurality of material points on the cloth, and mapping the plurality of material points into the mesh of nodes. The mesh may comprise a regular-triangular mesh and a regular-rectangular mesh.

Calculating the change of geometry of the mesh of nodes at each time step may use an implicit Euler method. Dynamics of the mesh of nodes is described by $A\Delta v = b$, where A is a 3N×3N matrix, and b is a 3N×1 vector, wherein $$A = \left(I - hM^{-1}\frac{\partial F}{\partial v} - h^2 M^{-1}\frac{\partial F}{\partial x}\right) \text{ and } b = hM^{-1}\left(F^n + h\frac{\partial F}{\partial x}v^n\right),$$

corresponding to a equation of motion, $M\ddot{x} = F$, where M and F are the 3N×3N mass matrix and 3N×1 force vector. The $\Delta v$ is obtained by solving a system of linear equations, wherein the system matrix A is constant over time such that the matrix inversion is pre-computed only once in off-line.

The stretch force is obtained by a differentiation of the energy function. The $x_{ij}^*$ is given by a previous direction method, $$x_{ij}^* = L\frac{X_{ij}^n}{|x_{ij}^n|}, \text{ where } L = |x_{ij}^*|.$$

The $x_{ij}^*$ may be given by an inertial edge rotation, $$x_{ij}^* = L\frac{Rx_{ij}^n}{|x_{ij}^n|},$$

where a rotation matrix R is calculated according to a Rodrigues' formula by $h\omega = \theta\hat{\omega}$ for some scalar $\theta$, where $\hat{\omega}$ is the unit vector along $\omega$, and wherein R corresponding to the incremental rotation $h\omega$ is given by $I + \sin\theta[\hat{\omega}] + (1-\cos\theta)[\hat{\omega}]^2$, where $[\hat{\omega}]$ is the skew-symmetric matrix representing the cross-product operator $\hat{\omega}_x$. $\omega$ is given by an inertial vertex translation, $$\omega = \sum_{m=0}^{M} \alpha_m \omega^{n-m},$$

where $\alpha_m$ (m=0, ..., M) are constants to be adjusted. The $x_{ij}^*$ may be given by $$x_i^* = \sum_{m=0}^{M} \alpha_m x_i^{n-m},$$

and $$x_{ij}^* = L\frac{x_j^* - x_i^*}{|x_j^* - x_i^*|},$$

where $\alpha_m$ (m=0, ..., M) are constants to be adjusted.

Another aspect of the invention provides a method of simulation of a cloth using a triangular-based linear stretch and shear model. The method comprises: a) mapping information of geometry of material points, $P_1, \ldots, P_N$, of the cloth into a mesh of nodes, where N is the number of material points, and an $i^{th}$ node having a position $x_i$, a mass $m_i$, and a velocity $v_i$; b) calculating a change of geometry of the mesh of nodes at a plurality of time steps using a number of equations of motion based on a force applied to the node by applying linear stretch and shear models to translation and rotation of each mesh node, wherein the number of equations is less than or equal to 3N; and c) updating the position $x_i$ and the velocity $v_i$ of the mesh nodes, wherein an in-plane deformation of the cloth is represented by displacements of three neighboring vertices at $u_i = [u_i v_i]^T$, $u_j = [u_j v_j]^T$, and $u_k = [u_k v_k]^T$, wherein an energy function for the equations of motion of three neighboring nodes i, j, k during each time step comprises;

$$E^{st} = \frac{1}{2} A \{k_u |S_u - S_u^*|^2 + k_v |S_v - S_v^*|^2\}$$

and $$E^{sh} = \frac{1}{2} A \left\{ k_{\tilde{u}} \left| \frac{S_u + S_v}{\sqrt{2}} - S_{\tilde{u}}^* \right|^2 + k_{\tilde{v}} \left| \frac{S_u - S_v}{\sqrt{2}} - S_{\tilde{v}}^* \right|^2 \right\},$$

where A, $k_u$, $k_v$ are the area of the triangle in the undeformed state, u- and v-directional stiffnesses, wherein a triangle composed of three particles having material space coordinates $u_i = [u_i v_i]^T$, $u_j = [u_j v_j]^T$, and $u_k = [u_k v_k]^T$, where $x_i$, $x_j$, and $x_k$ are the corresponding 3D Cartesian space locations, and S is a mapping from the 3D material space to 3D Cartesian space, such that S(u,v) gives the 3D position of the material point (u,v), wherein $\tilde{u}$ and $\tilde{v}$ represent diagonal axes obtained by rotating u and v axes by +90 degrees, $k_{\tilde{u}}$ and $k_{\tilde{v}}$ represent $\tilde{u}$- and $\tilde{v}$-directional stiffnesses, and wherein the vector quantities $S_u^*$, $S_v^*$, $S_{\tilde{u}}^*$, and $S_{\tilde{v}}$ are calculated at each time step and are regarded constant in differentiating.

Even though the triangles have different stretch and shear strains, the strain is constant within each triangle.

The vector quantities are given by an inertial axes rotation, $S_u^* = \tilde{S}_u^{n+1} / |\tilde{S}_u^{n+1}|$, $$S_v^* = \tilde{S}_v^{n+1} / |\tilde{S}_v^{n+1}|, \quad S_{\tilde{u}}^* = \frac{S_u^* + S_v^*}{|S_u^* + S_v^*|},$$

$$S_{\tilde{v}}^* = \frac{S_u^* - S_v^*}{|S_u^* - S_v^*|}, \quad \tilde{S}_u^{n+1} = \frac{R(h\omega) S_u^n}{|S_u^n|},$$

and $$\tilde{S}_v^{n+1} = \frac{R(h\omega) S_v^n}{|S_v^n|},$$

wherein the triangle is assumed to make an inertial movement during the short duration of $[t^n, t^{n+1}]$, and wherein $S_u^{n+1}$ and $S_v^{n+1}$ are obtained by rotating $S_u^n$ and $S_v^n$ by hω.

The rotation matrix R may be calculated according to a Rodrigues' formula by $h\omega = \theta \hat{\omega}$ for some scalar θ, where $\hat{\omega}$ is the unit vector along ω, and wherein R corresponding to the incremental rotation hω is given by $I + \sin\theta[\hat{\omega}] + (1 - \cos\theta)[\hat{\omega}]^2$, where $[\hat{\omega}]$ is the skew-symmetric matrix representing the cross-product operator $\hat{\omega}_x$. ω is given by $$\omega = \sum_{m=0}^{M} \alpha_m \omega^{n-m},$$

where $\alpha_m$ (m=0, ..., M) are constants to be adjusted.

The vector quantities are given by an inertial vertex translation, $S_u^* = ax_i^* + bx_j^* + cx_k^*$, and $S_v^* = px_i^* + qx_j^* + rx_k^*$, where a, b, c, p, q, and r are constant to be adjusted.

The $x_i^*$ may be given by $$x_i^* = \sum_{m=0}^{M} \alpha_m x_i^{n-m},$$

where $\alpha_m$ (m=0, ..., M) are constants to be adjusted.

The method may further comprise manipulating for each node of the mesh: a position constraints; a orientation constraints; a mixed constraints; and a static position constraints. The updating and manipulation can be performed in real-time.

BRIEF DESCRIPTION OF THE DRAWINGS

Various aspects and advantages of the invention will become apparent and more readily appreciated from the following description of embodiments, taken in conjunction with the accompanying drawings of which.

DETAILED DESCRIPTION OF EMBODIMENTS

Various aspects of the invention provide new techniques for simulation of clothes. The disclosed techniques fix several flaws that existed in the previous real-time models. Also, the new techniques allow for several levels of quality vs. speed tradeoffs, providing a wide gamut of scalability. Therefore, the techniques of the invention provide immediate uses in real-time applications such as video games and VR simulations. Also, these techniques can be incorporated into off-line systems for previewing clothing animations before making more accurate versions of them.

Physical models for representing cloth can be classified into two: edge-based systems and area-based systems. Edge-based systems measure the in-plane deformation based on the current length of the edges, whereas triangle based systems, an area-based system, measure the in-plane deformation based on the areal deformation of each triangle defined by three nodes. Embodiments of the invention provide linearizable physical models for the stretch/shear deformations in edge-based systems and area-based systems.

Figure 1:
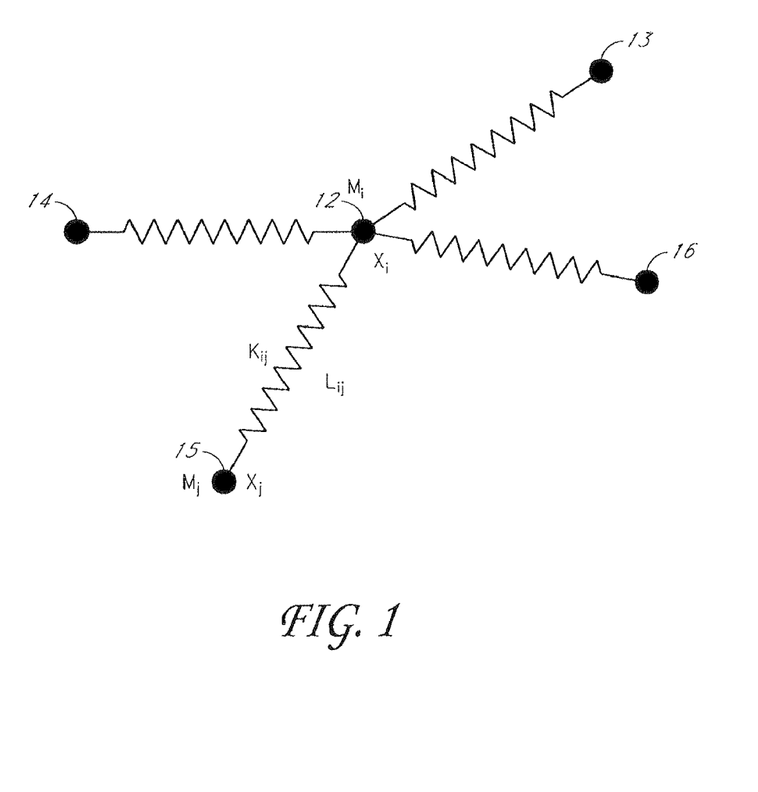
FIG. 1 is a diagram illustrating a mass-spring model for simulating a cloth according to the invention.

In a simulation, a piece of cloth is represented with N particles $(P_1, P_2, \ldots, P_N)$ 12, 13, 14, 15, 16 as shown in FIG. 1. The position and mass of each particle are denoted as $x_i$ and $m_i$, respectively. A vector x, 3N-dimensional vector, which is constructed by concatenating $x_1, x_2, \ldots, x_N$. The $x_i$ (i=1 to N) varies over time t. Since the position and the vector are varying with time, they may be written as $x_i(t)$ and x(t). $x_i^n$ and $x^n$ are the values of $x_i$ and x at n-th discrete time step. Also, the notational convention $x_{ij} = x_j - x_i$ is used to represent a vector interconnecting the positions represented by $x_i$ and $x_j$. An edge defined by two nodes represented by $x_i$ and $x_j$ can be represented by $x_{ij}$.

Edge-Based Formulation of Stretch Energy and Force

The stretch energy $E_{ij}^s$ held on the deformed edge $x_{ij}$ may be modeled by the formula $$E_{ij}^s = \frac{1}{2} k_{ij} (|x_{ij}| - L_{ij})^2, \qquad (1)$$

where $L_{ij}$ and $k_{ij}$ are the rest length and the stiffness, respectively, of the edge. Once the energy potential is defined, then the restorative force acting on $P_i$ that is contributed from the edge $x_{ij}$ is given by the spatial derivative of the energy potential:

$$-\frac{\partial E_{ij}^s}{\partial x_i} = k_{ij}(|x_{ij}| - L_{ij}) \frac{x_{ij}}{|x_{ij}|}. \qquad (2)$$

The above stems from the material's restoration tendency and is called the internal force. The restorative force $f_i$ acting on $P_i$ from all the adjacent edges is given by the summation $$f_i = \sum_{j \in N(i)} k_{ij}(|x_{ij}| - L_{ij}) \frac{x_{ij}}{|x_{ij}|}, \qquad (3)$$

where $N(i)$ is the set of indices of the particles which $P_i$ is connected to.

Explicit Formulation

To find out mechanical movement of a particle, the total force acting on the particle is needed. In addition to the internal force, $P_i$ also experiences external forces such as gravity and air drag. Summation of all the external forces acting on $P_i$ is represented as $f_i^{ext}$. $F_i$ is a summation of all the internal and external forces acting on $P_i$, i.e., $F_i = f_i + f_i^{ext}$. Newton's second law states that the movement of $P_i$ is governed by the equation $$m_i \ddot{x}_i = F_i. \qquad (4)$$

Equation 4 is formulated for every (non-constrained) particle, which may be assembled into a system of differential equations $$M\ddot{x} = F, \qquad (5)$$

where M and F are the 3N×3N mass matrix and 3N×1 force vector, respectively. Solving the above equation gives time-varying trajectories of the particles.

Implicit Formulation

The explicit formulation sounds intuitive. Moreover, it does not call for solving a system of linear equations, and thus straightforward to implement. However, the explicit formulation is prone to numerical instabilities. Unless very small time steps are used, the system often diverges. The implicit formulation described below has been known to be more stable.

In comparison with the explicit Euler method shown in Equation 5, the implicit Euler method samples the derivatives at $t^{n+1}$. That is, the implicit Euler method updates the system state according to $$\begin{bmatrix} \Delta x \\ \Delta v \end{bmatrix} = h \begin{bmatrix} v^n + \Delta v \\ M^{-1} F(x^n + \Delta x, v^n + \Delta v) \end{bmatrix}. \qquad (6)$$

In a rigorous sense, the time integration in this is called the semi-implicit Euler method. But, it is simply referred as implicit method.

A first order Taylor series expansion on $F(x^n + \Delta x, v^n + \Delta v)$ is applied to get $$F(x^n + \Delta x, v^n + \Delta v) = F^n + \frac{\partial F}{\partial x} \Delta x + \frac{\partial F}{\partial v} \Delta v.$$

Substituting the above to Equation 6 and eliminating $\Delta x$ produce $$\left(I - hM^{-1} \frac{\partial F}{\partial v} - h^2 M^{-1} \frac{\partial F}{\partial x}\right) \Delta v = hM^{-1} \left(F^n + h \frac{\partial F}{\partial x} v^n\right). \qquad (7)$$

Now, the equation can be solved for $\Delta v$, and the result can be used to compute $\Delta x = v^n + \Delta v$. In the above equation, $$A = \left(I - hM^{-1} \frac{\partial F}{\partial v} - h^2 M^{-1} \frac{\partial F}{\partial x}\right) \qquad (8)$$

$$b = hM^{-1} \left(F^n + h \frac{\partial F}{\partial x} v^n\right) \qquad (9)$$

so that Equation 7 can be written as $$A \Delta v = b. \qquad (10)$$

Here, "A" is a 3N×3N matrix, and "b" is a 3N×1 vector. Compared to the explicit methods, calculation of $\Delta v$ out of Equation 10 calls for solving a large system of linear equations. The stretch/shear model makes the system matrix A constant over time. Then, the matrix inversion can be pre-computed only once in off-line, so that the on-line simulation can be done fast.

The above speed-up is the result of adopting a simplified (less accurate) physical model, details of which will be described later. A stretch model that causes the matrix A to become constant in the context of implicit formulation has already been disclosed by Desbrun et al. [11], which is listed below. Their simplification was based on overlooking the rotational movements, which obviously resulted in artifacts. The difference of the model from theirs is that the simplification accounts for the rotational movements. As a consequence, the disclosed method can produce conspicuously improved results.

Thanks to the pioneering work of various groups over the past decade [4], [2], [13], [8], [1], [5], [3], also listed below, cloth can now be simulated with remarkable realism. For example, natural wrinkles can now be produced using the particle model, and the robustness of the collision handling in cloth simulations has been considerably improved. Along with the improvements that have been made in animation quality, the overall simulation algorithm has been refined such that it runs at a reasonable speed. For example, producing a 30 seconds long animation of an outfit represented with about 10,000 particles takes a few days excluding the time for rendering in the prior art.

However, there are several application areas in which simulation speed should be faster. For example, in video games, animation of cloth should be generated in real-time. Desbrun, Schroder, and Barr [11] pioneered the problem of real-time simulation of cloth-like objects. To accelerate the semi-implicit method, they omitted the non-linear force components and used only the linear components in calculating the force jacobian, which resulted in a constant system matrix. Therefore, once the inverted system matrix was precomputed at the initial stage, the linear system did not need to be solved at every time step. Omission of the non-linear components could lead to artifacts. To compensate the possible errors from the ignored non-linear forces, the angular momentum correction steps were taken at the end of simulating each time step. But those steps could not completely fix the problem; Even though the correction steps could preserve global angular momentum, they could not preserve angular momenta of local regions. The physical model also makes the system matrix constant. But, the non-linear forces are not overlooked altogether in the jacobian calculation.

Kang, Choi, and Cho [10], [9] also disclosed a simplification of the semi-implicit method that precomputes the inverted hessian matrix or avoids solving the large linear system. To achieve O(n) time complexity, the velocity change of each cloth particle is directly updated using explicitly estimated future velocities of the nearby particles that are connected to it.

Recently, Cordiner and Thalmann presented a real-time cloth animation system in [7]. They classified the cloth into three categories (tight, loose, floating) based on the cloth movement pattern and adopted different approach to animate them in each category. The movement of tight/loose regions is highly dependent on the body motion, and therefore such regions may not need full 3D simulation. Geometrical techniques were used for the tight and loose regions. On the other hand, the particle system with semi-implicit method was used for the floating regions. Since the floating regions might take up only a small portion in normal garments, the above technique could achieve real-time animation.

Edge-Based Linear Stretch Model

Figure 2:
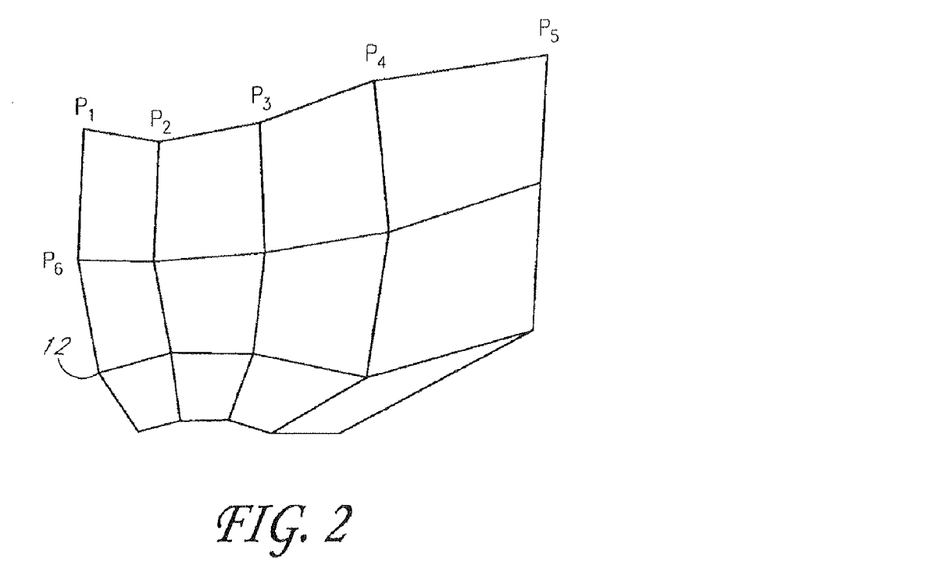
FIG. 2 is a diagram illustrating a rectangular mesh for nodes representing material points of the cloth, wherein the rectangular mesh comprises nodes, each having connections with neighboring nodes to form a quadrilateral shape.
Figure 3:
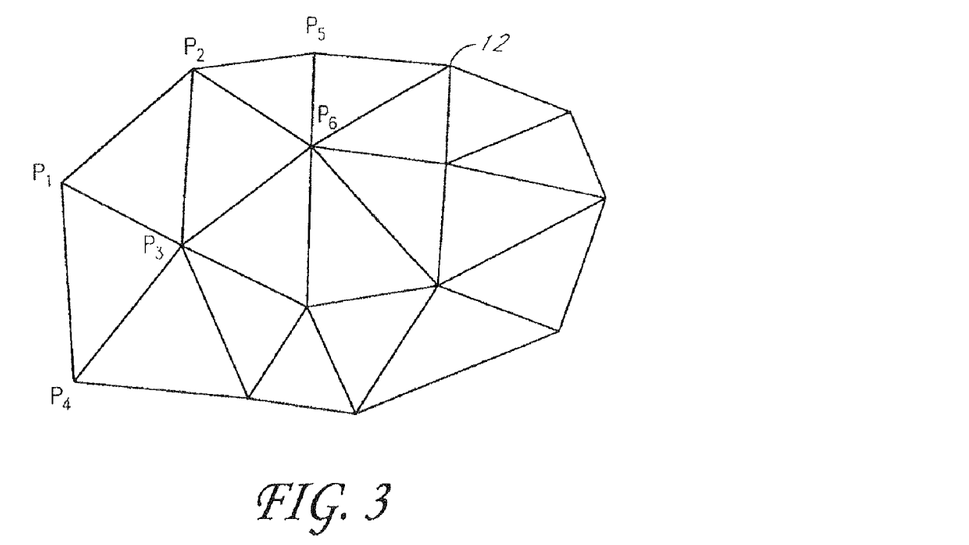
FIG. 3 is a diagram illustrating a triangular mesh for nodes representing material points of the cloth, wherein the triangular mesh comprises nodes, each having connections with neighboring nodes to for a triangular shape.

An edge-based system refers to mass-spring representation (referring to FIG. 1) of cloth in which in-plane deformation is realized by the stretches along the edges. The elementary deformable unit is an edge. A stretch energy function is disclosed for the edge between two particles $P_i$ and $P_j$, so that the restorative force and the force jacobians can be derived from it. Since it judges the deformation by looking at only limited part (i.e., only the edges) of the mesh, edge-based system makes more sense when the topological connectivity is kept the same at all edges. Therefore, edge-based system is adopted mostly in the context of regular meshes as shown in FIG. 2. There are two kinds of regular meshes that can be considered for cloth simulation: regular-triangular meshes as shown in FIG. 3, and regular-rectangular meshes as shown in FIG. 2. When a rectangular mesh is used, shear deformation can be simulated using the above edge-based stretch model by making diagonal connections.

Conventional Stretch Model

The stretch force and its jacobians are derived from the energy function. So, the task of developing a physical model that leads to constant system matrix is reduced to finding a new energy function that has such simplifying property. Differentiation of the conventional energy function $$E_{ij}^s = \frac{1}{2}k(|x_{ij}| - L)^2 \quad (11)$$

produces $$f_i = \sum_{j \in N(i)} k(|x_{ij}| - L)\frac{x_{ij}}{|x_{ij}|}, \quad (12)$$

which is not linear with respect to $x_i$ or $x_j$. Therefore, the force jacobian $\partial f/\partial x$ is not constant over time. Then, the linear system given in Equation 10 should be solved at every time step.

If there had been no norm operator $|\cdot|$ in the equation, then $f_i$ would have been linear. So the problem can be rephrased as: Can an energy function that obviates the use the norm operator but its value is close to that of Equation 11 be found?

Stretch Model

The energy function which is used is $$E_{ij}^s = \frac{1}{2}k(x_{ij} - x_{ij}^*) \cdot (x_{ij} - x_{ij}^*) \quad (13)$$

where $x_{ij}^*$ is some vector that is newly calculated at each time step but regarded constant when differentiating. There is no norm operator in the energy. Therefore the force jacobian $\partial f/\partial x$ is now constant.

An immediate question that can be raised would be whether there can exist the vector quantity $x_{ij}^*$ such that use of the above energy function produces acceptable stretch behavior of cloth? The answer turns out to be yes through experiments.

Then, what value is used for $x_{ij}^*$? To make Equation 13 match Equation 11 in the physical meaning, ideally, $x_{ij}^*$ should represent an unstretched version of $x_{ij}$. The situation can be expressed as the conditions: $|x_{ij}^*|=L$ and $x_{ij}^*//x_{ij}$, where // means "parallel". Equation 13 is being used for updating the value of $x_{ij}$, from $x_{ij}^n$ to $x_{ij}^{n+1}$. Therefore, the second condition can be more explicitly phrased as: $x_{ij}^*//x_{ij}^{n+1}$. Here, the problem is that $x_{ij}^{n+1}$ is not known yet. One way to circumvent this problem would be to use an estimated direction of $x_{ij}^{n+1}$.

Desbrun et al. [11] states " . . . (we) simply decide to overlook the rotation, and suppose that this non-linear part will stay constant . . . ". In the notation of an embodiment of the invention, the decision amounts to using $x_{ij}^n/|x_{ij}^n|$ for the estimated direction of $x_{ij}^{n+1}$. Therefore, the decision is equivalent to using $$x_{ij}^* = L\frac{x_{ij}^n}{|x_{ij}^n|} \quad (14)$$

Figure 4:
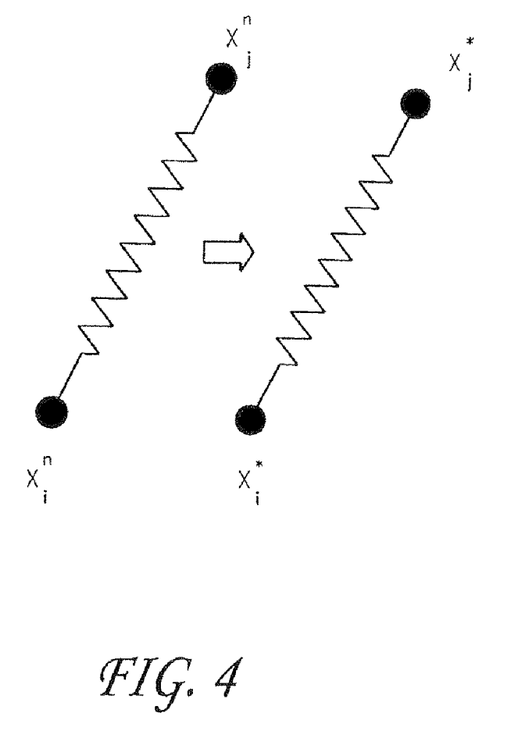
FIG. 4 is a schematic diagram illustrating a method to estimate of direction change of displacement according to a prior art.

This scheme is referred as the previous direction method. In the previous direction method as illustrated in FIG. 4, $x_{ij}^*$ is parallel to $x_{ij}^n$. Using the direction of the previous step is a flaw. The scheme produces a side effect: the simulated cloth exhibits a tendency to maintain the old (global) orientation of $x_{ij}$; such effect can accumulate over time. This side effect is persistent even when small time steps are used. They disclose a procedure which can be taken to enforce the preservation of the angular momentum. However, what is preserved by the procedure is angular momentum of the entire system. Angular momenta of the local portions are not preserved, which would be more important for the visual realism of the simulated results.

There may be two methods to estimate $x_{ij}^*$. One is called the inertial edge rotation, and the other is called the inertial vertex translation. Both of these methods do not have the above kind of flaw. When time steps are taken small enough, those methods do not experience particular side effect.

Figure 5:
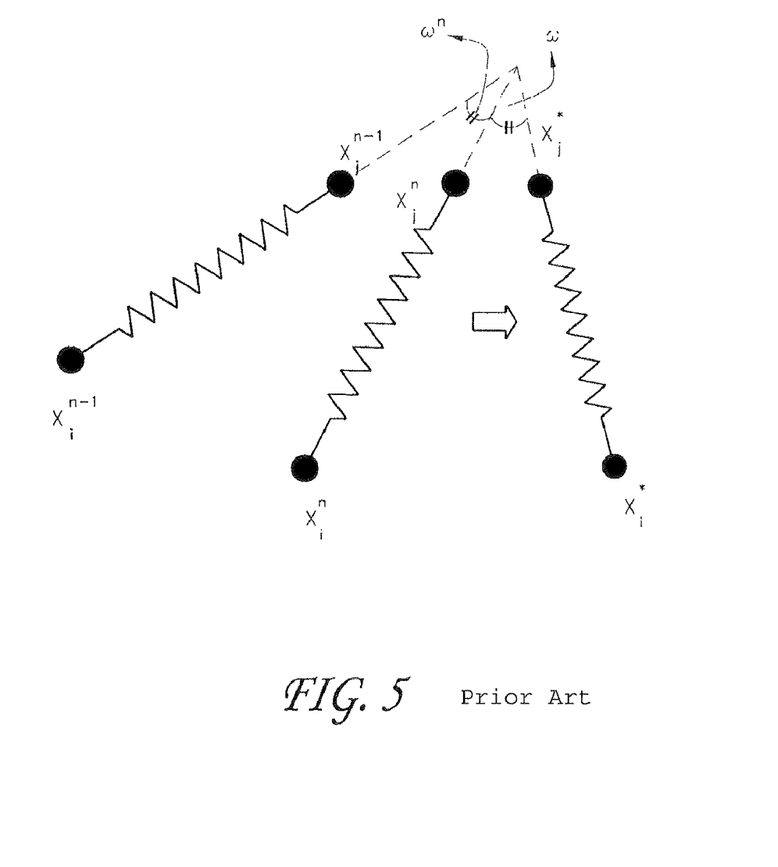
FIG. 5 is a schematic diagram illustrating a first order inertial edge rotation method to predict direction change of displacement according to an embodiment of the invention.

The Inertial Edge Rotation: The principal idea of the inertial edge rotation (IER) method is to predict the direction of $x_{ij}^{n+1}$ based on the angular velocity ω of $x_{ij}$ at $t^n$; it is assumed that $x_{ij}$ will continue to rotate with the angular velocity for the duration h as shown in FIG. 5. The rotation matrix R represents the estimated incremental orientation change that occurs during $[t^n, t^{n+1}]$. Then, the method calculates $x_{ij}^*$ according to $$x_{ij}^* = L \frac{R x_{ij}^n}{|x_{ij}^n|}. \tag{15}$$

The calculation of R is done according to the Rodrigues' formula. It may be written as $h\omega = \theta \hat{\omega}$ for some scalar θ, where $\hat{\omega}$ is the unit vector along ω. Then the rotation matrix R corresponding to the incremental rotation hω is given by product operator $\hat{\omega}_x$.

Finally, the angular velocity ω needs to be estimated. If the angle between $x_{ij}^{n-1}$ and $x_{ij}^n$ is denoted as $\angle(x_{ij}^{n-1}, x_{ij}^n)$, then the angular velocity $\omega^n$ at $t^n$ is approximated with $$\omega^n = \frac{\angle(x_{ij}^{n-1}, x_{ij}^n)}{h} \frac{x_{ij}^{n-1} \times x_{ij}^n}{|x_{ij}^{n-1} \times x_{ij}^n|}. \tag{16}$$

Similarly, the angular velocity $\omega^{n-1}$ at $t^{n-1}$ is approximated with $$\omega^{n-1} = \frac{\angle(x_{ij}^{n-2}, x_{ij}^{n-1})}{h} \frac{x_{ij}^{n-2} \times x_{ij}^{n-1}}{|x_{ij}^{n-2} \times x_{ij}^{n-1}|}. \tag{17}$$

Now, ω, the angular velocity at $t^{n+1}$, is estimated. Using the first-order prediction, ω is calculated by $$\omega = \chi^n. \tag{18}$$

Using the second-order prediction, the ω is calculated by $$\omega = \omega^n + (\omega^n - \omega^{n-1}) = 2\omega^n - \omega^{n-1}, \tag{19}$$

or using more general second-order prediction the ω is calculated by $$\omega = \alpha \omega^n + \beta \omega^{n-1}, \tag{20}$$

where α and β are constants to be adjusted. General higher-order explicit prediction of ω can be done with $$\omega = \sum_{m=0}^{M} \alpha_m \omega^{n-m}, \tag{21}$$

where $\alpha_m$ (m=0, ..., M) are constants to be adjusted.

Substituting Equation 15 into Equation 13, and regarding $x_{ij}^*$ as constant in differentiation, the stretch force is now linear with respect to x. Therefore, ∂F/∂x in Equation 7 is constant. The conventional model used for representing damping is already linear with respect to v. Therefore, ∂F/∂v is also constant. Therefore, the whole system matrix A is constant.

One problem that has been overlooked so far is that treating $x_{ij}^*$ as constant in the differentiation can lead to an artifact. Experimentation with the IER method reveals that the method occasionally produces vibratory results. It is predictable the artifact will be more noticeable when there is a large fluctuation in the value of $x_{ij}^*$. The inertial vertex translation method described below is more robust in that aspect.

Figure 6:
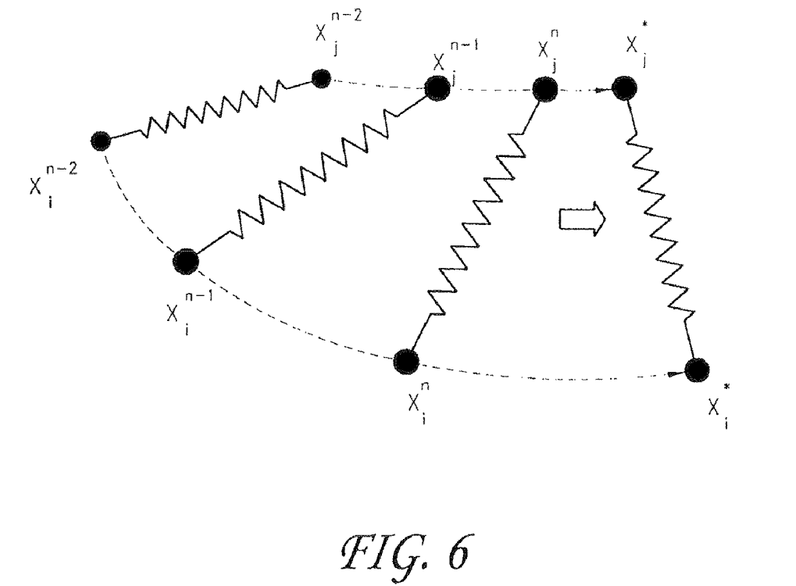
FIG. 6 is a schematic diagram illustrating a second order inertial vertex translation method according to another embodiment of the invention.

2) The Inertial Vertex Translation: Another method to estimate $x_{ij}^*$, the inertial vertex translation (IVT) method, is provided. The major difference from the IER is that, instead of assuming the edges are making inertial movements, IVT regards each vertex moves independently. When there is no specific information about the vertices movements, it may be assumed that each vertex makes an inertial movement as shown in FIG. 6.

The IVT method first calculates the estimated position $x_i^*$ of $x_i^{n+1}$ by assuming that it makes an inertial movement. For example, a first-order estimation can be made by $$x_i^* = x_i^n + (x_i^n - x_i^{n-1}) = 2x_i^n - x_i^{n-1}, \tag{22}$$

but more general first-order estimation can be made with $$x_i^* = \alpha x_i^n + \beta x_i^{n-1}, \tag{23}$$

where α and β are constants to be adjusted. A second-order estimation can be made with $$x_i^* = x_i^n + (x_i^n - x_i^{n-1}) + \frac{1}{2}(x_i^n - 2x_i^{n-1} + x_i^{n-2}), \tag{24}$$

but more general second-order estimation can be made with $$x_i^* = \gamma x_i^n - \delta x_i^{n-1} + \lambda x_i^{n-2}, \tag{25}$$

where γ, δ, and λ are constants to be adjusted. General higher-order estimation can be made with $$x_i^* = \sum_{m=0}^{M} \alpha_m x_i^{n-m}, \tag{26}$$

where $\alpha_m$ (m=0, ..., M) are constants to be adjusted.

The principal idea of the IVT method (compared to the IER method) does not lie in the specific scheme for estimating the new vertex position, but it lies in treating the vertices freely moving particles.

In another embodiment, the $x_{ij}^*$ may be estimated with $$x_{ij}^* = L \frac{x_j^* - x_i^*}{|x_j^* - x_i^*|} \tag{27}$$

When the IVT method is used, the vibratory artifact is reduced compared to the IER method. The reduction is more significant when the second order estimation is used.

Representation of Shear and Bending Deformations

A linear stretch model for the edge-based systems has been used. In representing cloth, the other two kinds of deformation are also considered: shear and bending.

In rectangular meshes, shear deformation can be represented with the model presented in the above by making diagonal connections. For representing the shear deformations in triangular meshes, the disclosed model is not particularly suited for. However, the triangular mesh intrinsically has a tendency to come back from shear deformations due to the mesh structure itself. This is a side effect the model originally did not intend to produce. To explicitly represent shear deformation in triangular meshes, the technique presented in the triangle-based linear stretch/shear model may be used.

Bending is not explicitly represented with the model. However, when an irregular triangular mesh is used, even without mobilizing any particular bending model, the simulated results will exhibit restorative tendency from bending deformation. It is due to the artificial flexural rigidity [12]. Again, it is a side effect the model originally did not intend to produce. This side effect can be exploited beneficially in the cases when the bending deformation cannot be explicitly simulated (In real-time applications, computation that can be allocated for clothing simulation is usually limited). An interesting aspect in exploiting this side effect is that, the irregularity of the mesh is beneficial.

When the computation that can be allocated to cloth simulation is highly scarce, then the edge-based linear stretch model can be adopted on an irregular triangular mesh, without explicitly modeling shear or bending deformation. The only springs in the model are the linear springs at the edges. The side-effects of the model described in the edge-based linear stretch model can be relied on to represent shear/bending deformation; The triangular network by its nature will create tendency to restore from shear deformation. Irregularity of the mesh will create tendency to restore from bending deformations. So, by applying the linear stretch model to a irregular triangular mesh, shear and bending behavior can be obtained as a by-product. The result may not be physically accurate, but can be useful in implementing real-time systems when speed is the utmost issue. Even in off-line systems, it adds another scalable option. Using the edge-based linear stretch model in the above is simple but very fast representation of cloth.

Triangle-Based Linear Stretch/Shear Model

A triangle-based system refers to interacting particles representation of cloth in which in-plane deformation is realized by the displacements of three vertices. The elementary deformable unit is a triangle. The stretch and shear energy functions for the triangle formed by $P_i$, $P_j$, and $P_k$ are disclosed so that the restorative force and the force jacobians can be derived from it. Since it judges the deformation by looking at the (triangular) area rather than just looking at the edges, triangle-based system is less sensitive to irregularity of the mesh. A striking difference from the edge-based linear stretch model is that, in the triangle-based model, the shear deformation can be accounted for.

Material Space to 3D Space Mapping S

In a triangle composed of three particles, their material space coordinates are $u_i=[u_i, v_i]^T$, $u_j=[u_j, v_j]^T$, $u_k=[u_k, v_k]^T$, and the corresponding 3D Cartesian space locations are $x_i$, $x_j$, $x_k$, respectively. If S is the mapping from the 3D material space to 3D Cartesian space, S(u,v) gives the 3D position of the material point (u,v). A simplifying assumption is that, even though triangles will have different stretch and shear strains, the strain is constant within each triangle. Under the above simplifying assumption, the partial derivatives $$S_u = \frac{\partial S}{\partial u} \text{ and } S_v = \frac{\partial S}{\partial v}$$

can be expressed in terms of $u_i$, $u_j$, $u_k$, $x_i$, $x_j$, $x_k$:

$$[S_u \ S_v] = [x_j - x_i \ x_k - x_i]\begin{bmatrix} u_j - u_i & u_k - u_i \\ v_j - v_i & v_k - v_i \end{bmatrix}^{-1}. \quad (28)$$

A notable consequence of the above equation is that both $S_u$ and $S_v$ can be expressed as linear combinations of $x_i$, $x_j$, $x_k$, $$S_u = ax_i + bx_j + cx_k \quad (29)$$

$$S_v = px_i + qx_j + rx_k \quad (30)$$

where a, b, c, p, q, and r are determined from the (undeformed) triangulization in the material space.

Conventional Stretch and Shear Model

In previously disclosed triangle-based models, the formula which was popularly used for representing the stretch energy was [1]

$$E^{st} = \frac{1}{2}A\{k_u(|S_u|-1)^2 + k_v(|S_v|-1)^2\}, \quad (31)$$

where A, $k_u$, $k_v$ are the area of the triangle (in the undeformed state), u- and v-directional stiffnesses, respectively. As for the shear energy, some used $$E^{sh} = \frac{1}{2}Ak_{sh}(S_u \cdot S_v)^2, \quad (32)$$

and other groups [6] used $$E^{sh} = \frac{1}{2}A\{k_{\tilde{u}}(|S_{\tilde{u}}|-1)^2 + k_{\tilde{v}}(|S_{\tilde{v}}|-1)^2\}, \quad (33)$$

where $\tilde{u}$ and $\tilde{v}$ represent diagonal axes obtained by rotating u and v axes by +90 degrees, $k_{\tilde{u}}$ and $k_{\tilde{v}}$ represent $\tilde{u}$- and $\tilde{v}$-directional stiffnesses. None of the above formulations make the system matrix constant.

Stretch and Shear Model

The energy functions are $$E^{st} = \frac{1}{2}A\{k_u|S_u - S_u^*|^2 + k_v|S_v - S_v^*|^2\} \quad (34)$$

$$E^{sh} = \frac{1}{2}A\left\{k_{\tilde{u}}\left|\frac{S_u+S_v}{\sqrt{2}} - S_{\tilde{u}}^*\right|^2 + k_{\tilde{v}}\left|\frac{S_u-S_v}{\sqrt{2}} - S_{\tilde{v}}^*\right|^2\right\}, \quad (35)$$

where the linear combinations given in Equations 29 and 30 are used for $S_u$ and $S_v$. It is not yet described how to calculate the vector quantities $S^*_u$, $S^*_v$, $S^*_{\tilde{u}}$, and $S^*_{\tilde{v}}$ that are supplied at each time step and are regarded constant in differentiating. But one thing is clear at this moment: the formulation makes the system matrix constant. Now, an immediate question would be whether there exist vector quantity $S^*_u$, $S^*_v$, $S^*_{\tilde{u}}$, and $S^*_{\tilde{v}}$ such that use of the above energy functions will produce acceptable stretch and shear behavior of cloth. As in the edge-based systems, the answer is yes and there are two ways to make the estimations: the inertial axes rotation and the inertial vertex translation.

1) The Inertial Axes Rotation: In principle, $S_u^*$ and $S_v^*$ should represent unstretched version of $S_u^{n-1}$ and $S_v^{n+1}$, respectively. Since $S_u^{n+1}$ and $S_v^{n+1}$ are not available, the estimations of them are used. $\tilde{S}_u^{n+1}$ and $\tilde{S}_v^{n+1}$ denote the estimations of $S_u^{n+1}$ and $S_v^{n+1}$. In one embodiment, the unstretched versions may be calculated as:

$$S_u^* = \tilde{S}_u^{n+1} / |\tilde{S}_u^{n+1}| \quad (36)$$

$$S_v^* = \tilde{S}_v^{n+1} / |\tilde{S}_v^{n+1}|. \quad (37)$$

Similarly, $S_{\hat{u}}^*$ and $S_{\hat{v}}^*$ should in principle represent unstretched version of $S_{\hat{u}}^{n+1}$ and $S_{\hat{v}}^{n+1}$, respectively. Denoting the estimations of $S_{\hat{u}}^{n+1}$ and $S_{\hat{v}}^{n+1}$ as $\tilde{S}_{\hat{u}}^{n+1}$ and $\tilde{S}_{\hat{v}}^{n+1}$, respectively, $S_{\hat{u}}^*$ and $S_{\hat{v}}^*$ may be calculated as:

$$S_{\hat{u}}^* = \tilde{S}_{\hat{u}}^{n+1}/|\tilde{S}_{\hat{u}}^{n+1}| \quad (38)$$

$$S_{\hat{v}}^* = \tilde{S}_{\hat{v}}^{n+1}/|\tilde{S}_{\hat{v}}^{n+1}| \quad (39)$$

A simpler way of calculating $S_{\hat{u}}^*$ and $S_{\hat{v}}^*$ is to assume that they are just perpendicular to $S_u^*$ and $S_v^*$. Under this assumption, the followings can be used.

$$S_{\hat{u}}^* = \frac{S_u^* + S_v^*}{|S_u^* + S_v^*|} \quad (40)$$

$$S_{\hat{v}}^* = \frac{S_u^* - S_v^*}{|S_u^* - S_v^*|}. \quad (41)$$

How the estimations $\tilde{S}_u^{n+1}$, $\tilde{S}_v^{n+1}$, $\tilde{S}_{\hat{u}}^{n+1}$ are made will be described below. Estimations of $\tilde{S}_{\hat{u}}^{n+1}$ and $\tilde{S}_{\hat{v}}^{n+1}$ can be done in a similar manner as $\tilde{S}_u^{n+1}$, $\tilde{S}_v^{n+1}$. The methods to estimate $\tilde{S}_u^{n+1}$ and $\tilde{S}_v^{n+1}$ and are described.

Assuming that the triangle will make an inertial movement during the short duration of $[t^n, t^{n+1}]$, the $S_u^{n+1}$ and $S_v^{n+1}$ can be predicted by rotating $S_u^n$ and $S_v^n$ by $h\omega$, i.e., the $\tilde{S}_u^{n+1}$ and $\tilde{S}_v^{n+1}$ can be calculated by $$\tilde{S}_u^{n+1} = \frac{R(h\omega)S_u^n}{|S_u^n|} \quad (42)$$

$$\tilde{S}_v^{n+1} = \frac{R(h\omega)S_v^n}{|S_v^n|}. \quad (43)$$

The estimation of $\omega$ can be done by the procedures introduced in the edge-based linear stretch model.

2) The Inertial Vertex Translation: When there is no prior information about the cloth movements, another plausible postulation to make is that the vertices will make inertial movements. The same procedures introduced in the edge-based linear stretch model may be applied to obtain the predicted position $x_i^*$ of $x_i^{n+1}$. Then, their linear combinations are taken according to Equations 29 and 30 to make the estimations:

$$S_u = ax_i^* + bx_j^* + cx_k^* \quad (44)$$

$$S_v = px_i^* + qx_j^* + rx_k^* \quad (45)$$

Embodiments of the invention provide the followings.

1) Linearizable energy function for edge-based systems: For formulating the in-plane stretch energy of an edge, it is disclosed to use $(x_{ij} - x_{ij}^*) \cdot (x_{ij} - x_{ij}^*)$, where $x_{ij}^*$ is some value supplied at each time step and regarded constant in differentiation. Conventional formulation of clothing simulation contains the term $(|x_{ij}| - C)^2$, the derivatives of which is nonlinear with respect to $x_{ij}$. It calls for solving a large system of linear equations. For linearization, it is disclosed to replace $(|x_{ij}| - C)^2$ with $(x_{ij} - x_{ij}^*) \cdot (x_{ij} - x_{ij}^*)$.

2) Inertial Edge Rotation method for estimating $x_{ij}^*$ in edge-based systems, which calculates $x_{ij}^*$ according to Equation 15.

3) Explicit predictions of $\omega$ It is disclosed to use Equations 18~21 for the prediction.

4) Inertial Vertex Translation method for estimating $x_{ij}^*$ in edge-based systems, which treats vertices as freely moving particles. The method calculates $x_{ij}^*$ according to Equation 27.

5) Explicit predictions of $x_i^*$: It is disclosed to use Equations 22~26 for the prediction.

6) Using the edge-based linear stretch model for representing cloth, with shear deformation or bending deformation or both not explicitly modeled: It is a pure mass-spring model. The side effects are relied on for the restoration from the shear and/or bending deformations. The primary gain of using this simple model is the speed-up.

7) Linearizable energy function for triangle-based systems: For formulating the in-plane stretch and shear energy functions of a triangle, it is disclosed to use Equations 34 and 35.

8) Inertial Axes Rotation method for estimating $S_u^*$, $S_v^*$, $S_{\hat{u}}^*$, $S_{\hat{v}}^*$, for the above triangle-based linear stretch/shear model, which calculates $S_u^*$, $S_v^*$, $S_{\hat{u}}^*$, $S_{\hat{v}}^*$ according to Equations 36-41.

9) Inertial Vertex Translation method for estimating $S_u^*$, $S_v^*$, $S_{\hat{u}}^*$, $S_{\hat{v}}^*$, for the above triangle based linear stretch/shear systems, which calculates $S_u^*$, $S_v^*$, $S_{\hat{u}}^*$, $S_{\hat{v}}^*$ according to Equations 44 and 45.

Figure 7:
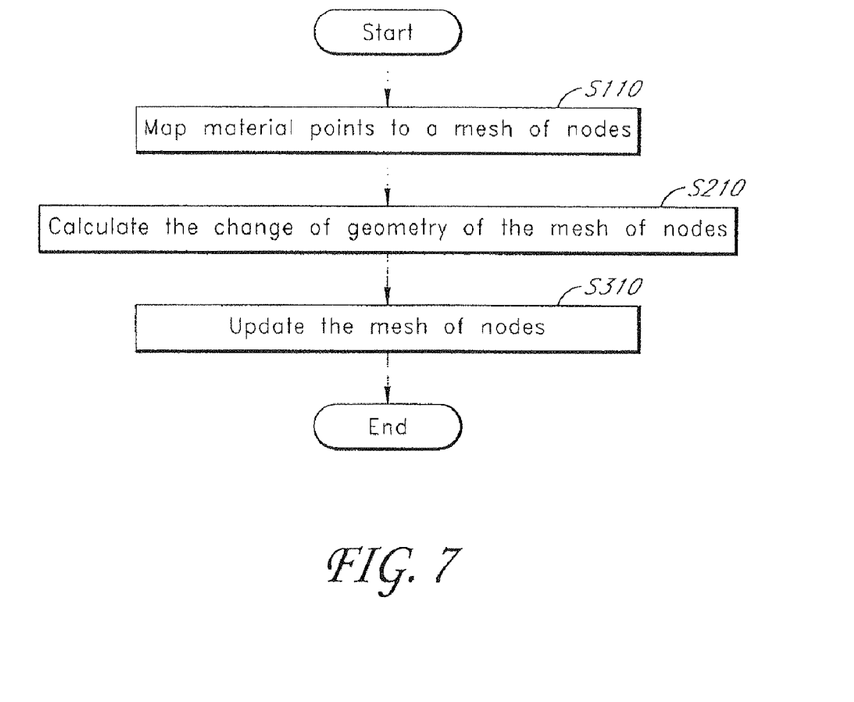
FIG. 7 is a flowchart illustrating the processes of an embodiment according to the invention.

One aspect of the invention provides a method of real-time simulation of a cloth using a linear stretch and shear model as illustrated in FIG. 7. The method comprises: a) mapping information of geometry of material points, $P_1, \ldots, P_N$, of the cloth into a mesh of nodes, where N is the number of material points, and an $i^{th}$ node of said mesh having a position $x_i$, a mass$_i$, and a velocity $v_i$ (S110); b) calculating a change of geometry of the mesh of nodes at a plurality of time steps using a number of equations of motion based on a force applied to the node by applying linear stretch and shear models to translation and rotation of each mesh node, wherein the number of equations is less than or equal to 3N (S210); and c) updating the position $x_i$ and the velocity $v_i$ of the mesh nodes, wherein an in-plane deformation of the cloth is represented by stretches along edges defined by two neighboring nodes (S310), wherein an energy function for the equations of motion of two neighboring nodes i, j is approximated during each time step as;

$$E_{ij}^s = \frac{1}{2}k(x_{ij} - x_{ij}^*) \cdot (x_{ij} - x_{ij}^*),$$

where k is a spring constant connecting the nodes i and j, $x_{ij} = x_j - x_i$, and $x_{ij}^*$ is a vector that is calculated at each time step but regarded as constant when differentiating, wherein at least part of the force used in the equations of motion is determined by differentiating the energy function.

In the energy equation, $(x - x^*) \cdot (x - x^*)$ is used instead of $(|x| - C)^2$, where $x^*$ is some value supplied at each time step. $x^*$ is regarded constant in further differentiation. Calculating $x^*$ is based on the simplifying assumption that cloth will make inertial movements. Other method for the calculation of $x^*$ may be used.

Although various embodiments of the present invention have been shown and described, it would be appreciated by those skilled in the art that changes might be made in this embodiment without departing from the principles and spirit of the invention, the scope of which is defined in the claims and their equivalents.

This application incorporates herein by reference the following papers and publications in their entirety:

[1] David Baraff and Andrew Witkin. Large steps in cloth simulation. In Proceedings of SIGGRAPH 98, Computer Graphics Proceedings, Annual Conference Series, pages 43-54. ACM, ACM Press/ACM SIGGRAPH, 1998;

[2] David E. Breen, Donald H. House, and Michael J. Wozny. Predicting the drape of woven cloth using interacting particles. In Proceedings of SIGGRAPH 94, Computer Graphics Proceedings, Annual Conference Series, pages 365-372. ACM, ACM Press/ACM SIGGRAPH, July 1994;

[3] Robert Bridson, Ronald P. Fedkiw, and John Anderson. Robust treatment of collisions, contact, and friction for cloth animation. In John Hughes, editor, SIGGRAPH 2002 Conference Proceedings, Annual Conference Series, pages 594-603. ACM Press/ACM SIGGRAPH, 2002;

[4] Michel Carignan, Ying Yang, Nadia Magnenat-Thalmann, and Daniel Thalmann. Dressing animated synthetic actors with complex deformable clothes. In Computer Graphics (Proceedings of ACM SIGGRAPH 92), pages 99-104. ACM, July 1992;

[5] Kwang-Jin Choi and Hyeong-Seok Ko. Stable but responsive cloth. In John Hughes, editor, SIGGRAPH 2002 Conference Proceedings, Annual Conference Series, pages 604-611. ACM Press/ACM SIGGRAPH, 2002;

[6] Kwang-Jin Choi and Hyeong-Seok Ko. Extending the immediate buckling model to triangular meshes for simulating complex clothes. In Eurographics 2003, short paper, 2003;

[7] Frederic Cordiner and Nadia Magnenat-Thalmann. Real-time animation of dressed virtual humans. In Eurographics 2002, 2002;

[8] Bernhard Eberhardt, Andreas Weber, and Wolfgang Strasser. A fast, flexible, particle-system model for cloth draping. IEEE Computer Graphics and Applications, 16(5):52-59, September 1996;

[9] Young-Min Kang and Hwan-Gue Cho. Bilayered approach for efficient animation of cloth with realistic wrinkles. In Computer Animation 2002, 2002;

[10] Young-Min Kang, Jeong-Hyeon Choi, Hwan-Gue Cho, and Chan-Jong Park. Fast and stable animation of cloth with an approximated implicit method. In Computer Graphics International, pages 247-256, 2000;

[11] Mark Meyer, Gilles Debunne, Mathieu Desbrun, and Alan H. Barr. Interactive animation of cloth-like objects in virtual reality. Journal of Visualization and Computer Animation (JVCA), 2001;

[12] P. Volino and N. Magnenat-Thalmann. Implementing fast cloth simulation with collision response. In Proceedings of the Conference on Computer Graphics International (CGI-00), pages 257-268, Jun. 19-24 2000; and

[13] Pascal Volino, Martin Courshesnes, and Nadia Magnenat Thalmann. Versatile and efficient techniques for simulating cloth and other deformable objects. In Proceedings of SIGGRAPH 95, Computer Graphics Proceedings, Annual Conference Series, pages 137-144. ACM, ACM Press/ACM SIGGRAPH, August 1995.

What is claimed is:

1. A method for simulating dynamic movements of a cloth in real time using a linear stretch and shear model in a computer having memory device, the method comprising steps of:
   a) mapping information of geometry of material points, $P_1, \ldots, P_N$, of the cloth into a mesh of nodes, where N is the number of material points, and an $i^{th}$ node of said mesh having a position vector $x_i$, a mass $m_i$, and a velocity vector $v_i$;
   b) calculating a change of geometry of the mesh of nodes at a plurality of time steps using a number of equations of motion based on a force applied to the node by applying linear stretch and shear models to translation and rotation of each mesh node, wherein the number of equations is less than or equal to 3N; and
   c) updating the position $x_i$ and the velocity $v_i$ of the mesh nodes,
   wherein an in-plane deformation of the cloth is represented by stretches along edges defined by two neighboring nodes, wherein an energy function for the equations of motion of two neighboring nodes i, j is approximated during each time step as;

$$E_{ij}^s = \frac{1}{2}k(x_{ij} - x_{ij}^*) \cdot (x_{ij} - x_{ij}^*),$$

where k is a spring constant connecting the nodes i and j, $x_{ij}=x_j-x_i$, and $x^*_{ij}$ is a vector that is calculated at each time step but regarded as constant when differentiating, where $x_j$ is a position vector of the $j^{th}$ node of said mesh, wherein at least part of the force used in the equations of motion is determined by differentiating the energy function,
wherein the steps are performed in a computer for a movie, animation, game, or virtual reality simulation.

2. The method of claim 1, wherein the step of mapping information of geometry of material points comprises steps of:
   selecting a plurality of material points on the cloth, and
   mapping the plurality of material points into the mesh of nodes.

3. The method of claim 2, wherein the mesh comprises a regular-triangular mesh and a regular-rectangular mesh.

4. The method of claim 1, wherein calculating the change of geometry of the mesh of nodes at each time step uses an implicit Euler method.

5. The method of claim 4, wherein a dynamics of the mesh of nodes are described by $$A\Delta v = b,$$

where A is a 3N×3N matrix, $\Delta v$ is a change of velocity, and b is a 3N×1 vector, wherein $$A = \left(I - hM^{-1}\frac{\partial F}{\partial v} - h^2 M^{-1}\frac{\partial F}{\partial x}\right)$$

$$b = hM^{-1}\left(F^n + h\frac{\partial F}{\partial x}v^n\right),$$

corresponding to a equation of motion, $M\ddot{x}=F$, where M and F are the 3N×3N mass matrix and 3N×1 force vector, respectively, h is a time step, $v^n$ and $F^n$ are velocity and force at n-th discrete time step.

6. The method of claim 5, wherein $\Delta v$ is obtained by solving a system of linear equations, wherein the system matrix A is constant over time such that a matrix inversion is pre-computed only once in off-line.

7. The method of claim 1, wherein a stretch force is obtained by a differentiation of the energy function.

8. The method of claim 7, wherein $x^*_{ij}$ is given by a previous direction method, $$x_{ij}^* = L\frac{x_{ij}^n}{|x_{ij}^n|},$$

where $|x^*_{ij}|=L$, wherein L is a length of $x^*_{ij}$ representing an unstretched version of $x_{ij}$, and $x^n_{ij}$ represents $x_{ij}$ at n-th discrete time step.

9. The method of claim 7, wherein $x^*_{ij}$ is given by an inertial edge rotation, $$x^*_{ij} = L \frac{Rx^n_{ij}}{|x^n_{ij}|},$$

where L is a length of an unstretched version of $x_{ij}$, $x^n_{ij}$ represents $x_{ij}$ at n-th discrete time step, a rotation matrix R is calculated according to a Rodrigues' formula by $h\omega=\theta\hat{\omega}$ for some scalar $\theta$, where $\hat{\omega}$ is the unit vector along an angular velocity $\omega$, and h is a time step, and wherein R corresponding to the incremental rotation $h\omega$ is given by $I+\sin\theta[\hat{\omega}]+(1-\cos\theta)[\hat{\omega}]^2$, where $[\hat{\omega}]$ is the skew-symmetric matrix representing a cross-product operator $\hat{\omega}_x$, and I is an identity matrix.

10. The method of claim 9, wherein $\omega$ is given by an inertial vertex translation using an explicit prediction, $$\omega = \sum_{m=0}^{M} \alpha_m \omega^{n-m},$$

where n represents an n-th discrete time step, $\omega^{n-m}$ is an angular velocity at an (n−m)-th discrete time step, and $\alpha_m$ are constants to be adjusted, where m is an integer from 0 to M.

11. The method of claim 7, wherein $x^*_{ij}$ is given by $$x^*_i = \sum_{m=0}^{M} \alpha_m x_i^{n-m},$$

and $$x^*_{ij} = L \frac{x^*_j - x^*_i}{|x^*_j - x^*_i|},$$

where L is a length of an unstretched version of $x^*_{ij}$, n represents an n-th discrete time step, $x_i^{n-m}$ is a position vector of an i-th node at an (n−m)-th discrete time step, $x^*_j$ is an estimated position of j-th node, and $\alpha_m$ are constants to be adjusted, where m is an integer from 0 to M.

12. A method of real-time simulation of a cloth using a linear stretch and shear model in a computer having memory device, the method comprising steps of:
 a) mapping information of geometry of material points, $P_1, \ldots, P_N$, of the cloth into a mesh of nodes, where N is the number of material points, and an $i^{th}$ node having a position $x_i$, a mass $m_i$, and a velocity $v_i$;
 b) calculating a change of geometry of the mesh of nodes at a plurality of time steps $t^1, t^2, \ldots t^n, t^{n+1}, \ldots$, wherein n is integer, using a number of equations of motion based on a force applied to the node by applying linear stretch and shear models to translation and rotation of each mesh node, wherein the number of equations is less than or equal to 3N; and
 c) updating the position $x_i$ and the velocity $v_i$ of the mesh nodes,
wherein an in-plane deformation of the cloth is represented by displacements of three neighboring vertices at $u_i=[u_iv_i]^T$, $u_j=[u_jv_j]^T$, and $u_k=[u_kv_k]^T$, wherein an energy function for the equations of motion of three neighboring nodes i, j, k during each time step comprises:

$$E^{st} = \frac{1}{2}A\{k_u|S_u - S^*_u|^2 + k_v|S_v - S^*_v|^2\}$$

$$E^{sh} = \frac{1}{2}A\left\{k_{\tilde{u}}\left|\frac{S_u + S_v}{\sqrt{2}} - S^*_{\tilde{u}}\right|^2 + k_{\tilde{v}}\left|\frac{S_u - S_v}{\sqrt{2}} - S^*_{\tilde{v}}\right|^2\right\}$$

where A, $k_u$, $k_v$ are the area of a triangle in the undeformed state, u- and v-directional stiffnesses and $S_u=\partial S/\partial u$ and $S_v=\partial S/\partial v$ are partial derivatives, wherein a triangle composed of three particles having material space coordinates $u_i=[u_iv_i]^T$, $u_j=[u_jv_j^T]$, and $u_k=[u_kv_k]^T$, where $x_i$, $x_j$, and $x_k$ are the corresponding 3D Cartesian space locations, and S is a mapping from the 3D material space to 3D Cartesian space, such that S(u,v) gives a Cartesian 3D position of the material point (u,v), wherein ũ and ṽ represent diagonal axes obtained by rotating u and v axes by +90 degrees, $k_{\tilde{u}}$ and $k_{\tilde{v}}$ represent ũ- and ṽ-directional stiffnesses, and wherein the vector quantities $S^*_u$, $S^*_v$, $S^*_{\tilde{u}}$, and $S^*_{\tilde{v}}$ are calculated at each time step and are regarded constant in differentiating, $S^*_u$ and $S^*_v$ represent unstretched version of partial derivatives with respect to u and v at (n+1)-th discrete time step, respectively, and $S^*_{\tilde{u}}$ and $S^*_{\tilde{v}}$ represent unstretched version of $S_{\tilde{u}}^{n+1}$ and $S_{\tilde{v}}^{n+1}$, partial derivatives with respect to ũ and ṽ at (n+1)-th discrete time step,
 wherein the steps are performed in a computer for a movie, animation, game, or virtual reality simulation.

13. The method of claim 12, wherein even though triangles have different stretch and shear strains, the stretch and shear strains are constant within each triangle.

14. The method of claim 12, wherein the vector quantities are given by an inertial axes rotation, $$S^*_u = \tilde{S}_u^{n+1}/|\tilde{S}_u^{n+1}|,$$

$$S^*_v = \tilde{S}_v^{n+1}/|\tilde{S}_v^{n+1}|,$$

$$S^*_{\tilde{u}} = \frac{S^*_u + S^*_v}{|S^*_u + S^*_v|},$$

$$S^*_{\tilde{v}} = \frac{S^*_u - S^*_v}{|S^*_u - S^*_v|},$$

$$\tilde{S}_u^{n+1} = \frac{R(h\omega)S_u^n}{|S_u^n|},$$

and $$\tilde{S}_v^{n+1} = \frac{R(h\omega)S_v^n}{|S_v^n|},$$

wherein the triangle is assumed to make an inertial movement during the short duration of $[t^n, t^{n+1}]$, and wherein $S_u^{n+1}$ and $S_v^{n+1}$ are obtained by rotating $S_u^n$ and $S_v^n$ by $h\omega$, where h is a time step and $\omega$ an angular velocity, and wherein R is a rotation matrix.

15. The method of claim 14, wherein the rotation matrix R is calculated according to a Rodrigues' formula by $h\omega=\theta\hat{\omega}$ for some scalar $\theta$, where $\hat{\omega}$ is the unit vector along the angular velocity $\omega$, and wherein R corresponding to the incremental rotation $h\omega$ is given by $I+\sin\theta[\hat{\omega}]+(1-\cos\theta)[\hat{\omega}]^2$, where $[\hat{\omega}]$ is the skew-symmetric matrix representing a cross-product operator $\hat{\omega}_x$, and I is an identity matrix.

16. The method of claim 15, wherein ω is given by $$\omega = \sum_{m=0}^{M} \alpha_m \omega^{n-m},$$

where n represents an n-th discrete time step, $\omega^{n-m}$ is an angular velocity at an (n−m)-th discrete time step, and $\alpha_m$ are constants to be adjusted, where m is an integer from 0 to M.

17. The method of claim 12, wherein the vector quantities are given by an inertial vertex translation, $$S^*_u = ax^*_i + bx^*_j + cx^*_k, \text{ and}$$

$$S^*_v = px^*_i + qx^*_j + rx^*_k,$$

where $x^*_i$, $x^*_j$, $x^*_k$ are estimated positions of i-, j-, and k-th nodes of $x_i^{n+1}$, $x_j^{n+1}$, $x_k^{n+1}$, respectively, where n+1 represents (n+1)-th discrete time step, and a, b, c, p, q, and r are constants to be adjusted.

18. The method of claim 17, wherein $x^*_i$ is given by $$x^*_i = \sum_{m=0}^{M} \alpha_m x_i^{n-m},$$

where $x_i^{n-m}$ is a position vector of an i-th node at an (n−m)-th discrete time step, and $\alpha_m$ are constants to be adjusted, where m is an integer from 0 to M.

19. The method of claim 12, further comprising manipulating for each node of the mesh:
a position constraints;
a orientation constraints;
a mixed constraints; and
a static position constraints.

20. A method of real-time simulation of a cloth using a linear stretch and shear model in a computer having memory device, the method comprising steps of:

a) mapping information of geometry of material points, $P_1, \ldots, P_N$, of the cloth into a mesh of nodes, where N is the number of material points, and an $i^{th}$ node of said mesh having a position $x_i$, a mass $m_i$ and a velocity $v_i$;

b) calculating a change of geometry of the mesh of nodes at a plurality of time steps using a number of equations of motion based on a force applied to the node by applying linear stretch and shear models to translation and rotation of each mesh node, wherein the number of equations is less than or equal to 3N;

c) updating the position $x_i$ and the velocity $v_i$ of the mesh nodes;

d) manipulating, at each of the nodes, a position constraints, a orientation constraints, a mixed constraints, and a static position constraints, wherein an in-plane deformation of the cloth is represented by stretches along edges defined by two neighboring nodes, wherein an energy function for the equations of motion of two neighboring nodes i, j is approximated during each time step as;

$$E_{ij}^s = \frac{1}{2} k(x_{ij} - x_{ij}^*) \cdot (x_{ij} - x_{ij}^*),$$

where k is a spring constant connecting the nodes i and j, $x_{ij} = x_j - x_i$, and $x^*_{ij}$ is a vector that is calculated at each time step but regarded as constant when differentiating, where $x_j$ is a position vector of the $j^{th}$ node of said mesh, wherein at least part of the force used in the equations of motion is determined by differentiating the energy function, and wherein updating and manipulating are configured to be performed in real-time, wherein the steps are performed in a computer for a movie, animation, game, or virtual reality simulation.

* * * * *